US011250444B2

(12) United States Patent
Yao et al.

(10) Patent No.: US 11,250,444 B2
(45) Date of Patent: Feb. 15, 2022

(54) IDENTIFYING AND LABELING FRAUDULENT STORE RETURN ACTIVITIES

(71) Applicant: Walmart Apollo, LLC, Bentonville, AR (US)

(72) Inventors: Yitao Yao, Saratoga, CA (US); Sangita Fatnani, Cupertino, CA (US); Guoyu Zhu, Sunnyvale, CA (US); Pei Wang, Saratoga, CA (US); Uday Akella, San Carlos, CA (US); Jaya Kolhatkar, Redwood City, CA (US); Vivek Crasta, Sunnyvale, CA (US); Hui-Min Chen, Pleasanton, CA (US); Vidhya Raman, San Jose, CA (US); Zhiping Tang, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 516 days.

(21) Appl. No.: 15/801,134

(22) Filed: Nov. 1, 2017

(65) Prior Publication Data
US 2018/0130071 A1 May 10, 2018

Related U.S. Application Data

(60) Provisional application No. 62/418,140, filed on Nov. 4, 2016.

(51) Int. Cl.
*G06Q 30/00* (2012.01)
*H04L 12/24* (2006.01)
(Continued)

(52) U.S. Cl.
CPC ....... *G06Q 30/0185* (2013.01); *G06K 9/6224* (2013.01); *G06K 9/6269* (2013.01); *G06K 19/06009* (2013.01); *H04L 41/14* (2013.01)

(58) Field of Classification Search
CPC . G06Q 30/0601–0645; G06Q 30/0185; G06K 9/6224; G06K 9/6269; G06K 19/06009; H04L 41/14
See application file for complete search history.

(56) References Cited

U.S. PATENT DOCUMENTS 8,738,529 B2   5/2014   Kolhatkar
8,751,399 B2   6/2014   Kolhatkar
(Continued)

OTHER PUBLICATIONS

"Aboud, Joshua, 'Mitigating Organized Retail Crime', Aug. 2015, ProQuest, pp. 19-29" (Year: 2015).*

*Primary Examiner* — Marissa Thein
*Assistant Examiner* — Maria S. P. Heath
(74) *Attorney, Agent, or Firm* — Duane Morris LLP; Manita Rawat

(57) ABSTRACT

A method and system for identifying and labeling fraudulent store return activities includes receiving, by a server, retailer events from an online transaction system of a retailer, the retailer events comprising records of transactions between customers and the retailer, including sale, exchange and return activities across multiple stores. The retailer events are processed to build a network that associates stores, transactions, payment instruments, and customer identification over related activity sequences of transactions. Return fraud labels are generated for the retailer events representing returns based on identified fraud characteristics of the related activity sequences by: representing behavior variables extracted from activity sequences by respective signature vectors; calculating pairwise similarity between the signature vectors; identifying clusters of the signature vectors having common behavior patterns based on the calculated pairwise similarity; and labeling the identified clusters of signature vectors as non-fraudulent behavior or fraudulent behavior.

25 Claims, 8 Drawing Sheets

(51) Int. Cl.
  *G06K 19/06* (2006.01)
  *G06K 9/62* (2006.01)

(56) References Cited

U.S. PATENT DOCUMENTS

| | | |
|---|---|---|
| 9,159,024 B2 | 10/2015 | Bhanot |
| 2011/0087606 A1* | 4/2011 | Hammond ............. G06Q 10/06 705/304 |
| 2014/0096249 A1* | 4/2014 | Dupont .................. G06F 21/00 726/23 |

* cited by examiner

| | Timestamp | Type of activity | Amount | Store number | Tender |
|---|---|---|---|---|---|
| 475 | 2017-06-18 22:04:00 | NRR | -$328.69 | ABC | 1 |
| | 2017-06-18 22:09:01 | SAL/PP | $318.05 | ABC | 1,2 |
| | 2017-06-18 22:18:00 | NRR | -$601.12 | ABC | 3 |
| | 2017-06-18 23:14:01 | SAL/PP | $55.08 | ABC | 1 |
| 477 | 2017-06-18 23:18:00 | SAL/PP | $581.14 | XYZ | 3 |
| | 2017-06-18 23:32:01 | SAL | $50.07 | XYZ | 3 |
| | 2017-06-19 02:10:00 | NRR | -$706.62 | ABC | 4 |
| 479 | 2017-06-19 13:26:01 | SAL | $8.74 | XYZ | 3 |
| | 2017-06-19 14:32:01 | SAL | $27.8 | DEF | 4 |

475 — Sequence 1: NRR-SAL/PP-SAL/PP
477 — Sequence 2: NRR-SAL/PP-SAL-SAL
479 — Sequence 3: NRR-SAL Activity Network (Graph) 480

IDENTIFYING AND LABELING FRAUDULENT STORE RETURN ACTIVITIES

CROSS-REFERENCE TO RELATED APPLICATION

This application claims priority from U.S. Provisional Patent Application No. 62/418,140, filed Nov. 4, 2016, titled "INTELLIGENT FRAUD ACTIVITY LABELING SYSTEM UTILIZING SELF-EVOLVING IDENTITY NETWORK AND ACTIVITY SEQUENCES FOR DETECTION AND PREVENTION OF FRAUDULENT STORE RETURNS", the entire disclosure of which is incorporated herein by reference.

BACKGROUND

The Assignee of the present application is a retailer having stores that generate over a million returns a day from over 4500 stores located all across U.S. Customers are attracted to the stores due in part to a liberal returns policy, which accepts non-receipted returns. Return fraudsters take advantage of this liberal policy and tend to manipulate the return process to perpetrate return fraud, i.e., the act of defrauding a retail store via the return process. There are many ways in which this crime is committed. For example, a fraudulent return may comprise a single transaction, such as a fraudster returning stolen merchandise to secure cash. A fraudulent return may also comprise multiple transactions, such as returning shoplifted item(s) and receiving a store value card, and using the store value card(s) to buy other item(s), and use the receipt to exchange items with extra cash added to cover the cost difference, and using the new receipt from previous exchange to return all item(s) in exchange for cash; these return, exchange and return would normally occur in difference stores.

Given a million+ legitimate returns, identifying fraudulent returns in real-time with minimal customer burden and time overhead is a challenging problem. One reason why identifying fraudulent returns in real-time is challenging with conventional systems and policy is because there is a lack of customer identity associated with in-store transactions, including both unknown customer sale and return histories. For example, a retailer that does not make use of loyalty cards faces difficulty in tracking customer identity and transaction history. The only time these retailers may obtain a customer identity is during a return over a certain dollar amount in which the stores of the retailer may ask the customer to show an ID.

Another reason for the challenge is that existing systems and policies do not provide any confirmed fraud labels in situations where the fraudulent return is suspected. Unlike in an online transaction where fraud occurs, whether the retailer detects the fraud or not, if the retailer proceeds with the transaction and in case of actual fraud, the retailer receives a confirmation of the fraud via a chargeback from a bank, that provides the retailer with a confirmed fraud label for the transaction. In store return fraud, however, there is no strong confirmation unless the return fraud is reported to law enforcement by the retailer, which is normally not done. Typically, a retailer will only initiate a law enforcement investigation for a small percentage of cases. In the majority of the cases, the retailer merely denies the return where the fraud is suspected and informs the customer the retailer is aware of the fraud as a deterrent to the customer from repeating the attempt.

Finally, compounding the problem is that the customer is present when a decision to accept or deny the return is conveyed by the retailer. Incorrectly accusing the customer of return fraud typically insults the customer and damages customer relations with the retailer. Therefore, any solution must have a low rate of false positive determinations of return fraud. In addition, fraud patterns change very quickly and there are even different fraud patterns across regions of the United States.

Accordingly, it would be desirable to provide an improved store return fraud detection system.

BRIEF SUMMARY

The exemplary embodiment provides methods and systems for identifying and labeling fraudulent store return activities. Aspects of the exemplary embodiments comprise: receiving, by a server, retailer events from an online transaction system of a retailer, the retailer events comprising records of transactions between customers and the retailer, including sale, exchange and return activities across multiple stores. The retailer events are processed to build a network that associates stores, transactions, payment instruments, and customer identification over related activity sequences of transactions. Return fraud labels are generated for the retailer events representing returns based on identified fraud characteristics of the related activity sequences by: representing behavior variables extracted from activity sequences by respective signature vectors; calculating pairwise similarity between the signature vectors; identifying clusters of the signature vectors having common behavior patterns based on the calculated pairwise similarity; and labeling the identified clusters of signature vectors as non-fraudulent behavior or fraudulent behavior.

According to the method and system disclosed herein, the exemplary embodiment provides improvements to existing fraud detection systems due to the novel self-evolving identity (customer identification, financial instrument, etc.) relationship network and associated activity sequences and graphs. The intelligent detection of anomalous sequences of activities, together with comprehensive evaluation of distinct characteristics of fraudulent activities, enables the generation of high-confidence fraud labels to some activity patterns. The labeled data further enables supervised learning models to predict fraudulent behavior at the early stage of fraudulent activity sequences before they are fully developed or terminated. The models derived from the supervised training may then be used to advise store return desk personal whether to deny, warn, or accept attempted store returns in real-time. Further, the system results in a lowered rate of false positive determinations of return fraud, thereby minimizing impact on customers.

DETAILED DESCRIPTION

Figure 1:
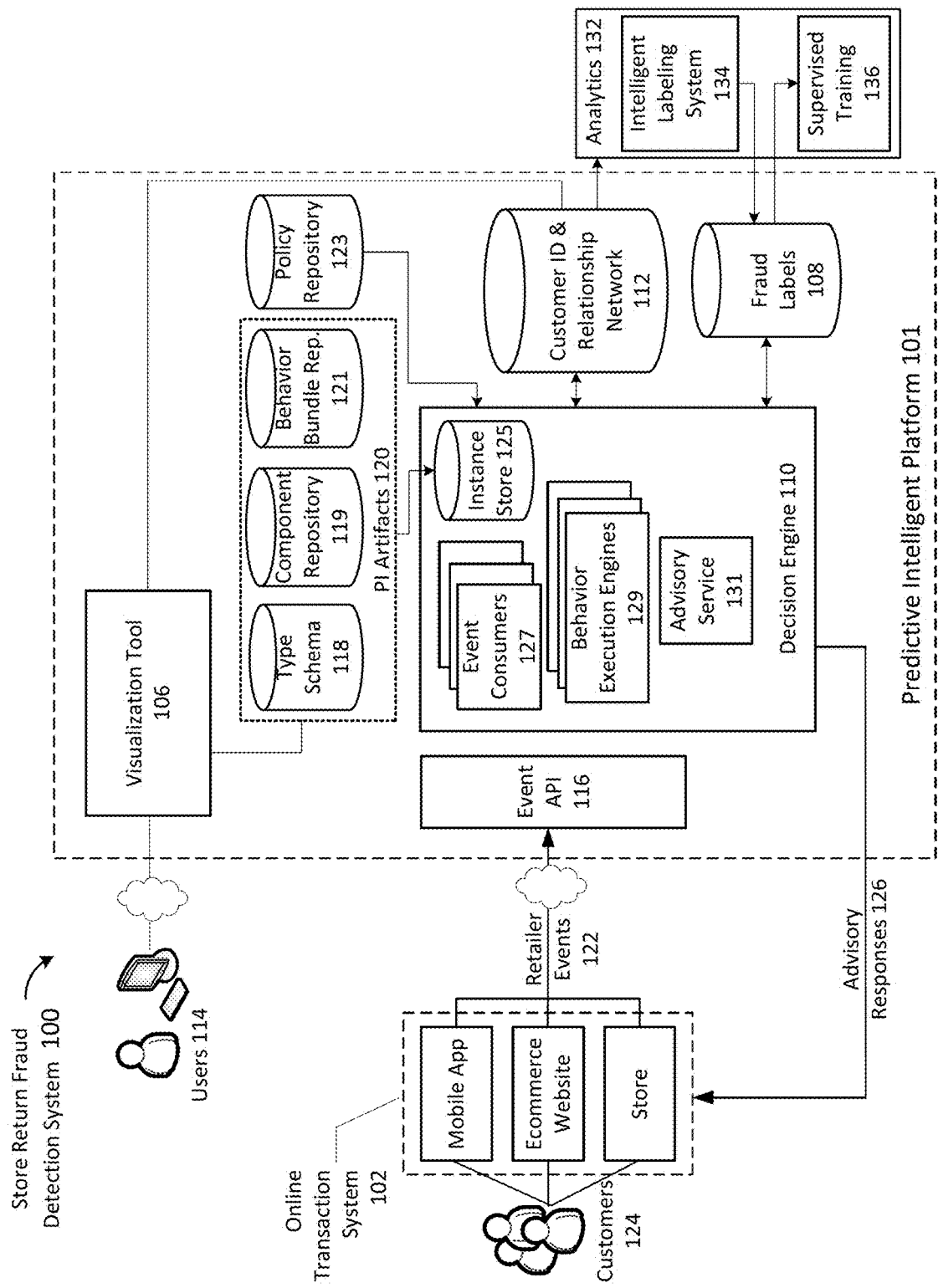
FIG. 1 is a diagram illustrating a store return fraud detection system according to one exemplary embodiment.

The exemplary embodiments relate to methods and systems for identifying and labeling fraudulent store return activities. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

This exemplary embodiment relates to a real-time store return fraud detection and labeling system that identifies and labels fraudulent activities or patterns using a self-evolving customer identity and relationship network. The exemplary embodiments describe a store return fraud detection system in the form of a web service that detects store return fraud. In one aspect, the store return fraud detection system generates a self-evolving customer identity and relationship network that connects individual store transactions including purchases, and returns, with payment methods and customer identification (e.g., driver license) when presented during non-receipted returns to link store activities. The customer identity and relationship network self-evolves as sales and returns take place and are incorporated into the network. In a further aspect, an iterative process is provided that combines human intelligent discovery with machine learning, and business knowledge to generate confirmed fraud labels from anomalous activity sequences via evaluating the strengths of obfuscation, profitability, efficiency, sophistication of the activity sequences. The confirmed fraud labels generated by this labeling process enable the building of supervised learning models to provide real-time predictive analytics to a retailer to enable the retailer to make in-store decisions on attempted return transactions/activities in real-time.

FIG. 1 is a diagram illustrating a store return fraud detection system according to one exemplary embodiment. The store return fraud detection system 100 includes a predictive intelligence (PI) platform 101 that comprises any number of application servers, web servers, and database servers (not shown). The PI platform 101 communicates with an online transaction systems 102 of a retailer over a private or public network, such as the Internet.

The predictive intelligence (PI) platform refers to a metadata-driven web service that provides real-time predictive analytics to one or more retail entities to enable the retail entities to make decisions on business transactions/activities in real-time and without having to write custom software. The PI platform 101 analyzes the events occurring on the online transaction system 102 in real time and provides predictions whether in-store returns are fraudulent. In one embodiment, the PI platform 101 may include an event API 116, a decision engine 110, a customer identity and relationship network 112, a visualization tool 106, fraud labels 108, predictive intelligence (PI) artifacts 120, and an analytics engine 132.

The event API 116 defines how the retailer transmits retailer events (122) from the online transaction system 102 into the PI platform 101. In one embodiment, the retailer events 122 comprise records of interactions and transactions between the customers 124 and the online transaction system 102. For retailer events 122 originating from merchandise returns at stores, the retailer events may include a product ID, a sales amount, any receipt information, payment information, and any customer identity (ID) information. For retailer events 122 originating from a mobile app and an e-commerce website, examples of retailer events 122 may include customer logins, page clicks, customer browsing history, and buying and return information, for instance. The buying and selling information may include an account number, a product ID, a merchant ID, a sales amount, a credit card number, a device ID, an IP address, and the like.

Predictive intelligence (PI) artifacts 120 are designed and produced by the retailer and its business operations using the PI platform 101 to capture and represent the activities from the business entity's online transaction system. The PI platform 101 processes the PI artifacts to provide the business entity information insight and intelligence about the business transactions/activities occurring on the online transaction system. In one embodiment, the PI artifacts 120 may comprise data and event types that may be stored in a type schema 118; component models that may be stored in a component repository 119; behavior bundles that may be stored in a behavior bundle repository 121, and business policies that may be stored in a policy repository 123. The data and event types are defined by the retailer to capture relevant business activities and operations. The component modules are designed and deployed by the retailer to provide reusable services and analytical models in terms of algorithms and functions. The behavior bundles are designed and deployed to process retailer events 122, update PI instance data refresh analytical models, and to perform predictive computations.

In one embodiment, a visualization tool 106 is provided that may enable a user 114 (e.g. retailer employee) to view and analyze business metrics and dashboards and to query and visualize data models, such as data graphs.

Once the PI artifacts 120 and the event API 116 are configured for the online transaction system 102, the decision engine 110 is invoked at runtime and begins receiving retailer events 122 from the online transaction system 102. The retailer events 122 are input to the predictive intelligence platform 101 through the event API 116.

The decision engine 110 may employ one or more event consumers 127, which may be assigned to different processing functionalities and/or different retailer event types. The event consumers 127 may call one or more behavior execution engines 129 to invoke corresponding behavior bundles. The processing of retailer events by the event consumers 127 and corresponding behavior bundles may update the instances of the types in the instance store 125. The decision engine 110 also employs one or more advisory services 131, which may also call the behavior execution engines 129 to analyze the retailer events 122 based on the types, behavior bundles, algorithms and models from the component modules defined by the PI artifacts 120.

Based on this analysis, the advisory service 131 computes advisory responses 126 for the events, and returns the advisory responses 126 to the online transaction system 102. In one embodiment, the advisory responses 126 may include probabilistic predictions regarding the events, such as a probabilistic prediction of a particular transaction being fraudulent. In one embodiment, the advisory responses 126 may include a score for the retailer events 122 in addition to, or instead of, a probabilistic prediction. The business entity may then use the advisory responses 126 to help make business decisions regarding the retailer events 122.

In one embodiment, the retailer events 122 may also include feedback (not shown) from the business about the correctness of the advisory responses 126. For example, the business entity may send a notification of whether the customer's return was finally denied based on the decision provided by PI platform 101 without any customer complaint, or the decision was reverted by the review process of the store associates and/or investigators. The PI platform 101 may use the feedback to modify the PI artifacts 120 and improve future advisory responses.

According to the embodiments disclosed herein, a non-real time analytic component 132 is used to analyze customer ID and relationship networks and return fraud labels 108 that may be used by the real-time PI platform 101 to provide advisory responses 126 in response to attempted store returns if they are related to those labeled networks, as described further below. But most importantly, fraud labels 108 will be used by component 136 to carry out supervised learning. In one embodiment, the analytics component 132 includes an intelligent labeling system 134 and a supervised training component 136. In one embodiment, the intelligent labeling system 134 analyzes activity sequences within the retailer events 122 and generates fraud labels. The supervised training component creates segmentation models for use by the PI platform 101 when generating the advisory responses 126.

The components shown in FIG. 1 may be executed by any type and combination of computers and servers. Although not shown, the servers and computers comprising the PI platform 101 include hardware components of typical computing devices, including one or more processors, input/output devices, computer-readable media, e.g., memory and storage devices (e.g., flash memory, hard drive, optical disk drive, magnetic disk drive, and the like) containing computer instructions that implement the functionality disclosed when executed by the processor. The servers and the computers may further include wired or wireless network communication interfaces for communication over the network.

Additional implementation details of the store return fraud detection system 100 are described in U.S. Pat. No. 9,159,024, assigned to the assignee of the present application and herein incorporated by reference.

Figure 2:
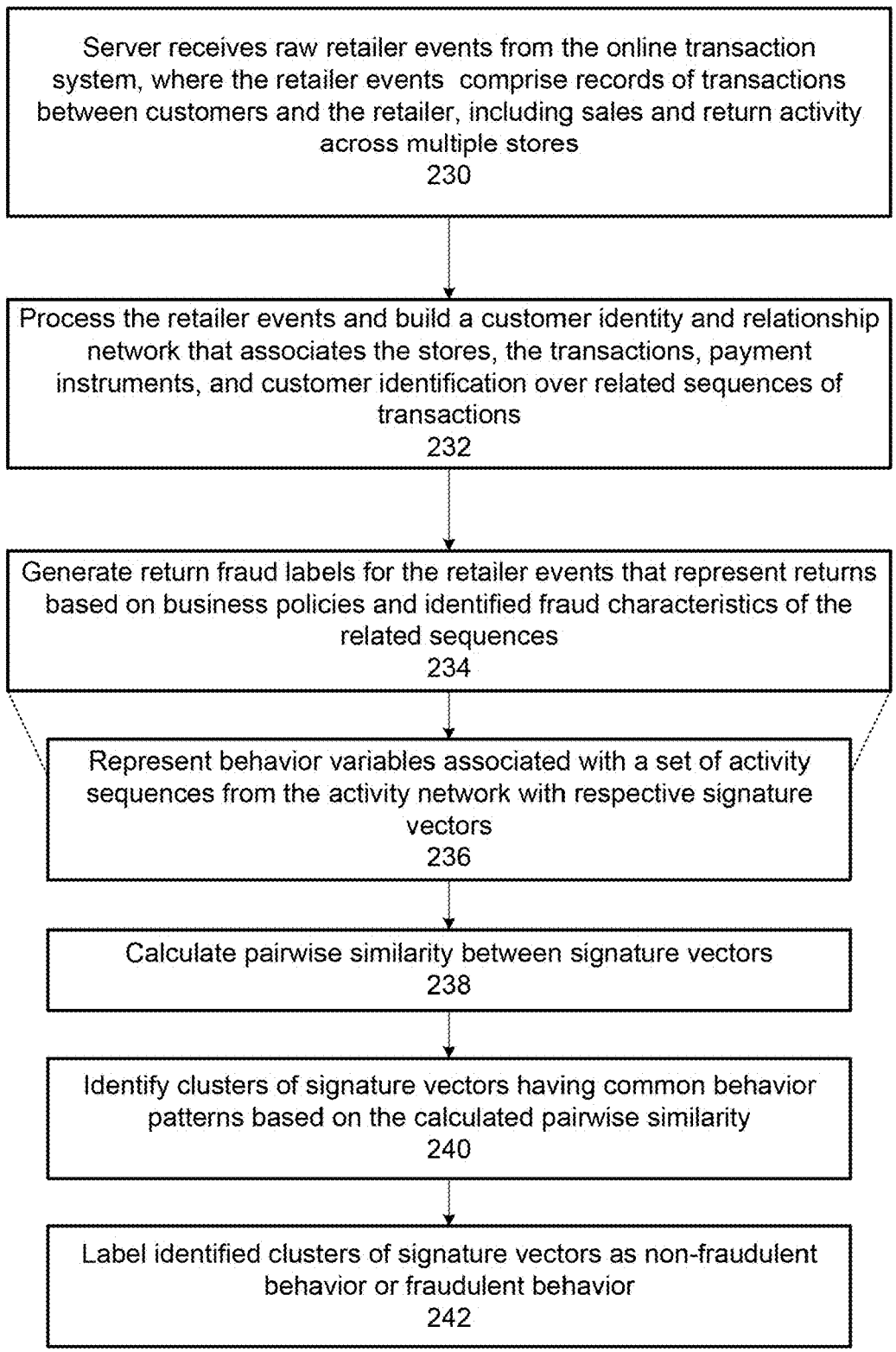
FIG. 2 is a flow diagram illustrating one embodiment of a process performed by the predictive intelligence platform for identifying and labeling fraudulent store return activities.

FIG. 2 is a flow diagram illustrating one embodiment of a process performed by the predictive intelligence platform 101 for identifying and labeling fraudulent store return activities. The process may begin by a server receiving raw retailer events 122 from the online transaction system 102, where the retailer events 122 comprise records of transactions between customers and the retailer, including sales and return activity across multiple stores (block 230).

The behavior engines 129 may process the retailer events 122 and build a customer identity and relationship network 112 that associates the stores, the transactions, payment instruments, and customer identification over related sequences of transactions (block 232). In one embodiment, the decision engine 110 is responsive to receiving the retailer events 122 through the event API 116, to execute the behavior execution engines 129 via behavior bundles and referenced component modules) related to particular entity events. The behavior execution engine 129 may then analyze relationships found between past retailer events and time-series metrics associated with the past retailer events to build the customer identity and relationship network 112, as explained further below.

The behavior engines 129 may generate return fraud labels for the retailer events that represent returns based on business policies and identified fraud characteristics of the related sequences (block 234).

Generation of return fraud labels (block 234) has sub processes (as shown by the dashed line). The generation of return fraud labels may include representing behavior variables associated with a set of activity sequences in the activity network by respective signature vectors (block 236). This step may include first identifying a set of behavior variables that will be used to model or represent the set of activity sequences.

Once the behavior variables associated with a set of activity sequences in an activity network (graph) are represented by the signature vectors, the intelligent labeling system 134 (FIG. 1) calculates pairwise similarity between signature vectors (block 238).

Given the pairwise similarity signature vectors calculated for the activity sequences, the intelligent labeling system 134 identifies clusters of signature vectors having common behavior patterns based on the calculated pairwise similarity (block 240).

Finally, a classification scheme is used to evaluate label identified clusters of signature vectors as good behavior or fraudulent behavior (block 242). In one embodiment, the classification scheme may involve human judgment, operational insights, or an analytical technique such as scoring or decision trees to label the identified clusters of signature vectors as good behavior or fraudulent behavior, based on its combined behavior characteristics such as strengths of obfuscation, profitability, efficiency, sophistication, repetitiveness, etc. As used herein, the classification of phrases "good behavior" and "fraudulent behavior" may also include classification as acceptable and not acceptable transactions, and the like.

Figure 3:
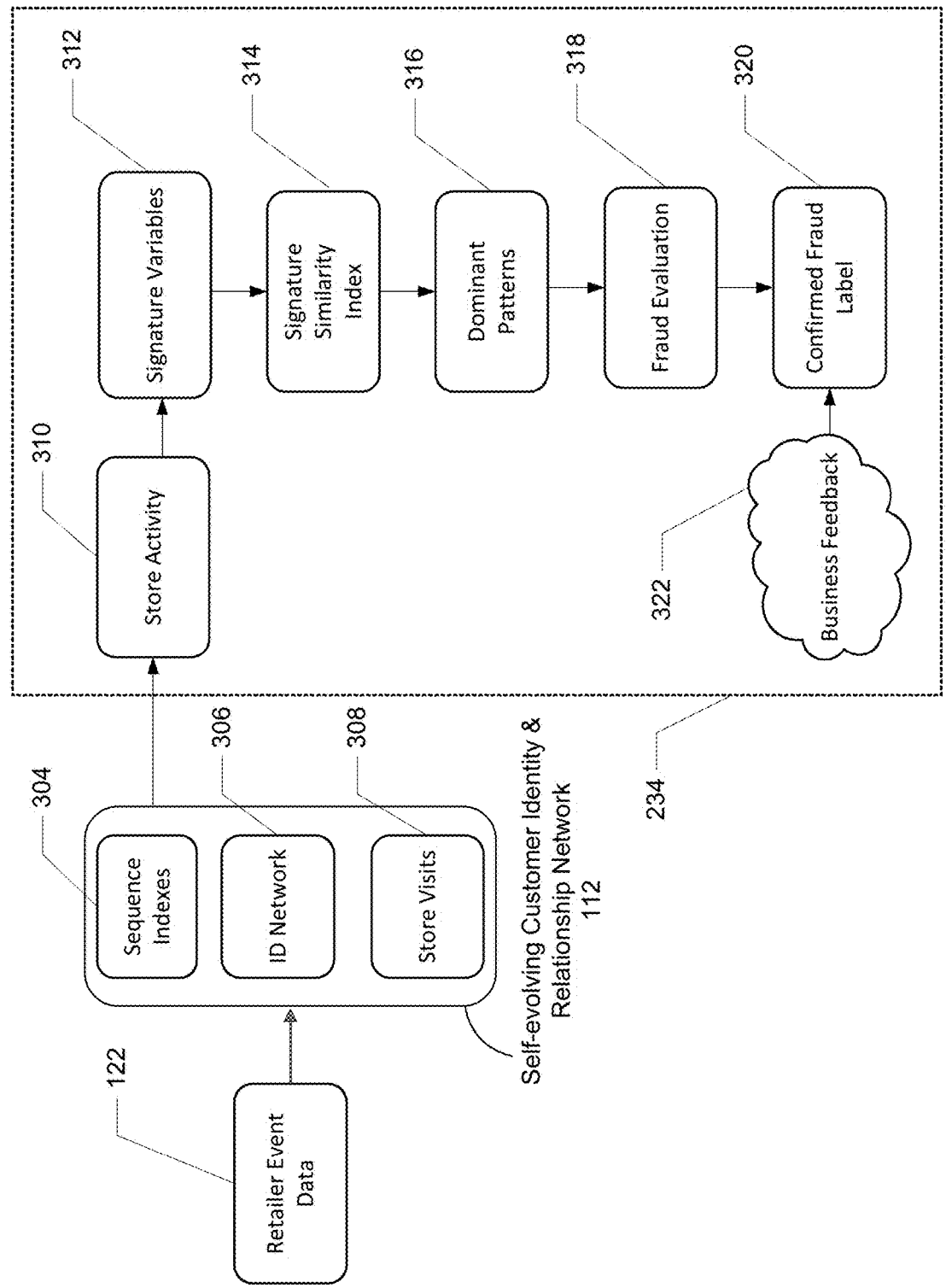
FIG. 3 is a diagram illustrating return fraud processing in further detail.

FIG. 3 is a diagram illustrating return fraud processing in further detail. FIG. 3 describes the process of intelligently identifying and labeling fraudulent activities or patterns from a self-evolving customer identity and relationship network.

Referring to both the FIGS. 1 and 3, raw retailer event data 122 are received and used to build the self-evolving customer identity and relationship network 112. In one embodiment, the system may receive approximately 200 million events a day. The event data 122 may include all type of sales activity, including returns and exchanges. According to one aspect of exemplary embodiments, the behavior execution engines 129 store the data in a form that captures activity sequences and activity networks. That is, transactional information, such as receipts, payment instruments, and customer identification (e.g., driver license, military ID, passport, and the like) presented during non-receipted returns, may be used to establish the store activity network.

According to one aspect of the exemplary embodiment, the customer ID and relationship network 112 is meta-data-driven to overcome the deficiencies of traditional social network approaches. The network 112 provides a foundation for building reliable risk management and advisory services that depend on a comprehensive activity network.

In one embodiment, the customer ID and activity network 112 may be divided into multiple components that help summarize associations. In one embodiment, the multiple components may comprise sequence indexes 304, an identity (ID) network 306, and store visits 308. The ID network 306 and the store visits 308 may together keep associations between stores, transactional information, such as receipts, payment instruments, and customer identification (e.g., driver license) presented during non-receipted returns. For example, the ID network 306 may contain customer IDs, payment instrument IDs (e.g., credit cards, store value cards and the like) and any associations between them. The store visits 308 may store all customer transaction details and is keyed by a unique visit ID, but without any built-in relationship between the transactions.

In one embodiment, both the ID network 306 and the store visits 308 may be implemented as an information data graph that includes nodes (such as customers, products, stores payment instruments, and the like), edges or links connecting the nodes, which represent relationships between the nodes, while the sequence indexes 304 act as a key for searching the nodes and for data graph traversal and retrieval.

Building the Customer Id and Relationship Network 112

The following section describes terminology employed to process and model retailer events 122 by the store return fraud detection system 100 with a focus on merchandise returns. A retailer event 122 may represent any type of business conducted between a customer and the retailer. According to one embodiment, the retail events 122 are first characterized by associating at least a portion of the retail events with one or more different types of retailer events. Examples of different types of retailer events for a store visit, for instance, can include a purchase or sale (SAL), a receipted return (RR), or non-receipted return (NRR). Table 1 shows a list of different types of retailer events that are relevant to return fraud detection and are made part of the customer ID and relationship network 112 according to one embodiment.

TABLE 1

| Retailer event | Label |
|---|---|
| NRR | A non-receipted return |
| NREXCH | A non-receipted return plus merchandise exchange |
| RR | A receipted return |
| RREXCH | A receipted return plus merchandise exchange |
| SAL | A store purchase |

According to one embodiment, the retail events 122 may also be characterized by associating at least a portion of the retail events with one or more different types of channels used to exit funds. Examples of different types of channels used to exit funds may include a store value card, a cash refund, refund to a prepaid card, and the like. Table 2 shows a list of retailer events with modifiers indicating a channel used to exit funds that are relevant to return fraud detection and are made part of the customer ID and relationship network 112 according to one embodiment.

TABLE 2

| Retailer event | Label |
|---|---|
| NRR/SVC | A non-receipted return with refund going into a Wal-Mart SVC (store value card) |
| RR/SVC | A receipted return with refund going into a Wal-Mart SVC (store value card) |
| RR/CASH | A receipted return with a cash refund |
| RREXCH/PP | A receipted return plus merchandise exchange with refund going into a prepaid card |
| RREXCH/CASH | A receipted return plus merchandise exchange with a cash refund |
| SAL/PP | Purchase of a prepaid card |
| SAL/CCDC | A purchased funded by a credit card or a debit card |

In addition, a retailer event may be associated with an event ID, a timestamp, a store number, a transaction amount, a funding or receiving tender number, and a customer ID (e.g., driver's license number) in case of a non-receipted return.

Activity Sequences

According to one embodiment, the customer ID and relationship network 112 may represent a list of retailer events 122 as a sequence of activities arranged in chronological order, referred to herein as activity sequences. The retailer events 122 may be associated with multiple customer IDs over time but are connected to each other through the same funding or receiving tender. Moreover, a long activity sequence of retailer events may be broken down into shorter segments of activity sequences if the strength of linking is weak. For example, a customer may sell a store value card to someone else and thus the type of activities originating from that store value card are better treated separately. Table 3 illustrates a list of retailer events 122 across a three-day period that may be represented as a non-receipt return (NRR)-initiated activity sequence.

TABLE 3

| Timestamp | Type of activity | Amount | Store number | Tender |
|---|---|---|---|---|
| 2017-09-12 11:24:01 | NRR | −$22.58 | ABC | 1 |
| 2017-09-12 13:13:01 | SAL | $13.96 | XYZ | 1 |
| 2017-09-13 21:30:01 | RR | −$12.36 | XYZ | 1 |
| 2017-09-15 21:10:00 | SAL | $12.84 | EFG | 1 |

According to one embodiment, the list of retailer events in Table 3 may be represented by a chronological activity sequence having values NRR-SAL-RR-SAL.

Activity Network (Graph)

In one embodiment, each activity sequence may be represented by an activity network in the customer ID and relationship network 112. In one embodiment, each of the activity networks is a graph comprising one or more activity sequences connected through tenders or customer IDs. In one embodiment, activities may belong to more than one activity network. The store return fraud detection system allows ad-hoc retrieval of any activity network using an event ID or downloading numerous networks through a batch API.

Figure 4:
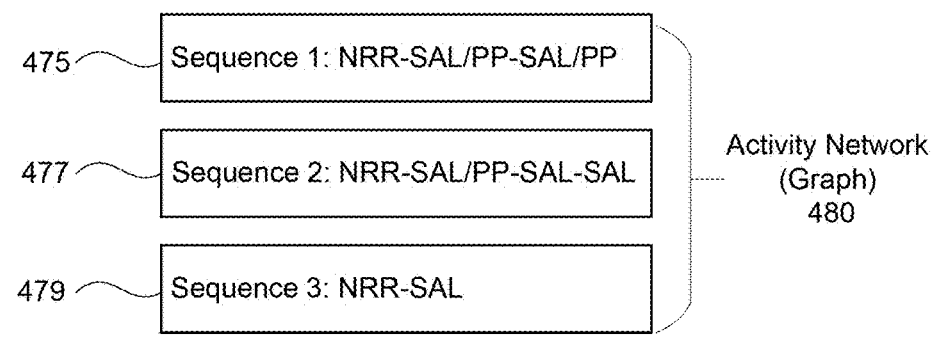
FIG. 4 shows a table listing example retailer events and formation of activity sequences and an activity network (graph).

FIG. 4 shows a table listing example retailer events and formation of activity sequences and an activity network (graph). In this example, the retailer events that are connected by common tenders (i.e., numerical representations of payment methods, e.g., 1=credit card, 2=cash, 3=gift card, and the like) are used to form respective activity sequences 475, 477, 479, where each of the activity sequences are initiated by a non-receipted return (NRR) visit. In this example, the activity sequences 475, 477, 479 comprise values representing the type of activity for each of the associated retailer events. Finally, an activity network 480 is formed that comprises the three activity sequences 475, 477, 479.

The activity sequences evolve continuously over time. For example, assume a customer has two consecutive non-receipted returns (NRR) loading two different store value cards. Given the customer uses a driver's license for both the non-receipted returns, the customer ID and relationship network 112 captures this activity sequence by creating nodes and associations between the two store value cards and the driver's license. Next, if the customer makes a purchase using both a credit card and one of the store value cards previously obtained, the sale transaction will be used to create a link between the activity sequence and the credit card, sale receipt from the transaction, respectively. Later, if there is a receipted return using the receipt from the previous sale and if the customer gets cash in return, then the receipted return is also appended to the activity sequence by the customer ID and relationship network 112. In this case, the two NRRs, the two store value cards, the credit card, the driver's license, the sale receipt, and the RR are all connected using the activity network graph.

As another example, the customer ID and relationship network 112 may associate a return transaction with any related activities following this return. Given a receipt from a sale, the customer ID and relationship network 112 grows the relationships when the receipt is used for future returns and yields future sales.

In one embodiment customer ID and relationship network 112 comprises a set of activity sequences represented by different vectors. The vectors may be based on receipts, tenders or payment instruments (e.g., check, credit card, stored value card, and the like), as explained further below.

The process of generating return fraud labels for the retailer events is shown in block 234 of FIG. 2 will now be described in further detail with respect to FIG. 3. Referring to FIG. 3, the exemplary embodiment utilizes the customer identity and relationship network 112 during an iterative process to generate return fraud labels for return events. The iterative process combines creation of signatures variables 312 with fraud evaluation 318 and business feedback 322 to generate confirmed return fraud labels 320.

According to one aspect of the exemplary embodiments, the fraud label generation process attempts to disambiguate normal activity sequences performed by fraudsters from regular activity sequences performed by normal customers by analyzing any combination of: strengths of obfuscation, profitability, efficiency, sophistication, repetitiveness, and the like, to discover fraud characteristics. For example, fraud returns are typically done in multiple stores in close proximity, rather than in the same store. That is, normal customer behavior typically doesn't visit three different stores to perform returns within three hours. Typical fraud is a repetitive activity. Another factor is the financial impact on the user generated by the returns. For example, if a customer has a stored value card of $100, a normal person will typically try to use the entire amount. However, a fraudster may be willing to spend $107 to buy a $100 prepaid card, e.g., returning a stolen item to generate the $107 and using it to purchase the prepaid card.

Activity Representation using Signature Vectors

Referring to FIG. 3, the process 234 may begin by analyzing store activity, including sales and returns, from the activity network (block 310) to generate the signature vectors to represent the activity sequences. As described, above, the store activity network 310 contains connections between the transactions based on the customer ID, receipt number, payment instrument ID and the like, and is built in real-time utilizing the sequence indexes 304, ID network 306 and store visits 308.

In order to identify common behavior or patterns existing in the activity networks, the present embodiments extract behavior variables from the activity sequences in the activity network, and represent the extracted behavior variables using respective signature vectors (block 312). In one embodiment, a signature vector comprises a vector of behavior variables. The purpose of a signature vector is to capture important behavior that is related to the objectives of interest. Meanwhile, a signature vector discretizes its component behavior variables whenever applicable to manifest the underlying structure. In one embodiment, the design of a signature vector may involve domain expertise, human judgment, and operational insights.

According to one embodiment, several different categories of behavior variables may be used to constitute a signature vector that represents a sequence of customer activities. In one embodiment, one or more categories of behavior variables may be extracted from the activity sequences including sequence behavior variables, mobility behavior variables, temporal behavior variables, fund exit behavior variables, and profitability behavior variables.

Below are Behavior Variables Tables 4-8, where each table comprises a different category of behavior variables. The Behavior Variables Tables 4-7 are in a 2-grams format, i.e., a two-step sequence, such as a Sale followed by a Return. The behavior variables are used to constitute a signature vector representing a sequence of customer activities. Each entry in the Tables includes a variable name followed by a label describing the customer sequential activity. In one embodiment, all the n behavior variables across the different categories from Tables 4-8 may be combined to create a signature vector for each activity sequence. In this example, n=36, which creates signature vectors having n behavior variables. In another embodiment, the behavior variables may be listed in one table or a set of different tables, and these tables may be stored in a database or other data repositories.

Table 4 is a list of sequential behavior variables used to measure number of occurrences of customer sequential activities.

TABLE 4

| Variable Name | Label |
|---|---|
| SQN_A1 | Number of occurrences of purchase followed by a receipted return (SAL-RR) |
| SQN_A2 | Number of occurrences of purchase followed by a non-receipted return (SAL-NRR) |
| SQN_A3 | Number of occurrences of purchase followed by a receipted return plus exchange (SAL_RREXCH) |
| SQN_A4 | Number of occurrences of purchase followed by a non-receipted return plus exchange (SAL-NREXCH) |
| SQN_A5 | Number of occurrences of purchase followed by another sale (SAL-SAL) |
| SQN_A6 | Number of occurrences of non-receipted return followed by a purchase (NRR-SAL) |
| SQN_A7 | Number of occurrences of non-receipted return followed by another non-receipted return (NRR-NRR) |
| SQN_A8 | Number of occurrences of non-receipted return followed by a receipted return (NRR-RR) |
| SQN_A9 | Number of occurrences of non-receipted return plus exchange followed by a receipted return (NREXCH-RR) |
| SQN_A10 | Number of occurrences of non-receipted return plus exchange followed by a receipted return plus exchange (NREXCH-RREXCH) |
| SQN_A11 | Number of occurrences of receipted return followed by another receipted return (RR-RR) |
| SQN_A12 | Number of occurrences of receipted return followed by a purchase (RR-SAL) |
| SQN_A13 | Number of occurrences of receipted return followed by a non-receipted return (RR-NRR) |
| SQN_A14 | Number of occurrences of receipted return plus exchange followed by a receipted return (RREXCH-RR) |
| SQN_A15 | Number of occurrences of receipted return plus exchange followed by another receipted return plus exchange (RREXCH-RREXCH) |
| SQN_A16 | Number of occurrences of non-receipted return plus exchange followed by a purchase (NREXCH-SAL) |

Table 5 is a list of mobility behavior variables used to measure customer mobility (i.e., different number of stores visited) within a sequence of activities.

TABLE 5

| Variable Name | Label |
|---|---|
| MOB_B1 | Number of different stores visited during any of the following sequence of activities: RR-RR, RR-NRR, RR-RREXCH, RR-NREXCH, NRR-RR, NRR-NRR, NRR-RREXCH, NRR-NREXCH, RREXCH-RR, NRR-SAL/PP, RREXCH-NRR, RREXCH-RREXCH, RREXCH-NREXCH, NREXCH-RR, NREXCH-NRR, NREXCH-RREXCH, NREXCH-NREXCH. Note that some other types of activities may occur in between. |

Table 6 is a list of temporal behavior variables used to measure recency and intensity of customer activities.

TABLE 6

| Variable Name | Label |
|---|---|
| TMP_C1 | Number of occurrences of any of the following sequence of activities within 14 days: RR-RR, RR-NRR, RR-RREXCH, RR-NREXCH, NRR-RR, NRR-NRR, NRR-RREXCH, NRR-NREXCH, RREXCH-RR, NRR-SAL/PP, RREXCH-NRR, RREXCH-RREXCH, RREXCH-NREXCH, NREXCH-RR, NREXCH-NRR, NREXCH-RREXCH, NREXCH-NREXCH. Note that some other types of activities may occur in between. |
| TMP_C2 | Number of occurrences of any of the following sequence of activities within 7 days: RR-RR, RR-NRR, RR-RREXCH, RR-NREXCH, NRR-RR, NRR-NRR, NRR-RREXCH, NRR-NREXCH, RREXCH-RR, NRR-SAL/PP, RREXCH-NRR, RREXCH-RREXCH, RREXCH-NREXCH, NREXCH-RR, NREXCH-NRR, NREXCH-RREXCH, NREXCH-NREXCH. Note that some other types of activities may occur in between. |
| TMP_C3 | Number of occurrences of any of the following sequence of activities within 2 days: RR-RR, RR-NRR, RR-RREXCH, RR-NREXCH, NRR-RR, NRR-NRR, NRR-RREXCH, NRR-NREXCH, RREXCH-RR, NRR-SAL/PP, RREXCH-NRR, RREXCH-RREXCH, RREXCH-NREXCH, NREXCH-RR, NREXCH-NRR, NREXCH-RREXCH, NREXCH-NREXCH. Note that some other types of activities may occur in between. |
| TMP_C4 | Number of occurrences of any of the following sequence of activities within one day: RR-RR, RR-NRR, RR-RREXCH, RR-NREXCH, NRR-RR, NRR-NRR, NRR-RREXCH, NRR-NREXCH, RREXCH-RR, NRR-SAL/PP, RREXCH-NRR, RREXCH-RREXCH, RREXCH-NREXCH, NREXCH-RR, NREXCH-NRR, NREXCH-RREXCH, NREXCH-NREXCH. Note that some other types of activities may occur in between. |

Table 7 is a list of fund exit behavior variables used to count occurrences of fund exit activities. Fund exit means the refund is credited back to a tender such as a cash refund, a refund to a credit card or a debit card, a refund to a SVC, or a refund that ends up with a prepaid card purchase.

TABLE 7

| Variable Name | Label |
|---|---|
| EXT_D1 | Number of occurrences of receipted return to SVC followed by a prepaid card purchase: RR/SVC-SAL/PP |
| EXT_D2 | Frequency of receipted return with a cash refund: RR/CASH |
| EXT_D3 | Number of occurrences of non-receipted return to SVC followed by a prepaid card purchase: NRR/SVC-SAL/PP |
| EXT_D4 | Number of occurrences of non-receipted return to SVC followed by a receipted return with a cash refund: NRR/SVC-RR/CASH |
| EXT_D5 | Number of occurrences of non-receipted return plus exchange followed by a receipted return with a cash refund: NREXCH-RR/CASH |
| EXT_D6 | Number of occurrences of a credit card or debit card purchase followed by a receipted return with a cash refund: SAL/CCDC-RR/CASH |
| EXT_D7 | Number of occurrences of receipted return plus exchange and a cash refund: RREXCH/CASH |
| EXT_D8 | Number of occurrences of non-receipted return to SVC followed by receipted return plus exchange and a cash refund: NRR/SVC-RREXCH/CASH |
| EXT_D9 | Number of occurrences of a credit card or debit card purchase followed by a receipted return plus exchange and a cash refund: SAL/CCDC-RREXCH/CASH |
| EXT_D10 | Number of occurrences of a credit card or debit card purchase followed by a receipted return and a credit card or debit card refund: SAL/CCDC-RR/CCDC |
| EXT_D11 | Number of occurrences of receipted return plus exchange and a prepaid card purchase: RREXCH/PP |

Table 8 is a list of profitability behavior variables used to measure the net refund (i.e., total refunds less total purchases) from a sequence of activities.

TABLE 8

| Variable Name | Label |
|---|---|
| PRF_E1 | Total return amount less total purchase (excluding prepaid card purchases) amount is greater than or equal to $100. |

TABLE 8-continued

| Variable Name | Label |
|---|---|
| PRF_E2 | Total return amount less total purchase (excluding prepaid card purchases) amount is greater than or equal to $20 but less than $100. |
| PRF_E3 | Total return amount less total purchase (excluding prepaid card purchases) amount is greater than or equal to zero but less than $20. |
| PRF_E4 | Total return amount less total purchase (excluding prepaid card purchases) amount is less than zero. |

Accordingly, each position in the signature vector represents a particular one of then behavior variables listed above (e.g., n=36), and therefore each signature vector comprises an n-dimensional vector. As an example, each signature vector $S=(BV_i)$, where BV stands for behavior variable and where i=1, 2 . . . 36.

Measuring Activity Similarity

Referring again to FIG. 3, once the set of sequence of activities extracted from an activity network (graph) are represented by the signature vectors, the next step is to calculate pairwise similarity between signature vectors (Block 314). In one embodiment, the intelligent labeling system 134 may create the signature vectors and calculate the similarity between pairs of the signature vectors.

As each signature vector carries discretized behavior information, the similarity between a pair of signature vectors can be extended and generalized into calculating a similarity metric (see equation [3] below) to discretized signature vectors with weighted behavior variables. This similarity metric may be referred to as a "signature similarity index (SSI)".

Signature Similarity Index

Given two n-dimensional nonnegative real vectors x, y $\in \mathfrak{R}^n$ and a weight $w_i$, which denotes the weight for individual behavior variable i, where i=1, 2, . . . , n and $w_i \in \mathfrak{R}^+$, where $\mathfrak{R}^+$ refers to a real number, the signature similarity index (SSI) between x and y is defined as follows:

$$SSI(x, y) = 1 - \frac{1}{\sum_{i=1}^{n} w_i I_i^x + \sum_{i=1}^{n} w_i I_i^y} \sum_{i \in I(x,y)} w_i \frac{|x_i - y_i|}{|x_i| + |y_i|} \quad (1)$$

where I(x·y) denotes the set of dimensions where the value of either vector is non-zero. That is, $$I(x \cdot y) = \{1 \le i \le n | x_i \ne 0 \text{ or } y_i \ne 0\} \quad (2)$$

and $I_i^x=1$ if $i \in I(x,y)$ and $x_i>0$. Otherwise, $I_i^x=0$ $I_i^y=1$ if $i \in I(x,y)$ and $y_i>0$. Otherwise, $I_i^y=0$  (3)

In one embodiment, the signature similarity index is a real number that ranges between 0 and 1. That is, for all x, y $\in \mathfrak{R}^n$, n>0, we have $0 \le SSI(x,y) \le 1$.

Proof. The triangle inequality gives $|x_i - y_i| \le |x_i| + |y_i|$ for all $1 \le i \le N$. Therefore, for any $i \in I(x \cdot y)$, we have $|x_i| + |y_i| > 0$ and $|x_i - y_i| \ge 0$, and thus $$0 \le \frac{|x_i - y_i|}{|x_i| + |y_i|} \le 1 \le (I_i^x + I_i^y) \quad (4)$$

Since $w_i \in \mathfrak{R}^+$ (i.e., $w_i > 0$), this implies $$0 \le \sum_{i \in I(x,y)} w_i \frac{|x_i - y_i|}{|x_i| + |y_i|} \le \left( \sum_{i \in I(x,y)} w_i I_i^x + \sum_{i \in I(x,y)} w_i I_i^y \right) \quad (5)$$

or equivalently $$0 \le \frac{1}{\sum_{i=1}^{n} w_i I_i^x + \sum_{i=1}^{n} w_i I_i^y} \sum_{i \in I(x,y)} w_i \frac{|x_i - y_i|}{|x_i| + |y_i|} \le 1 \quad (6)$$

Therefore, $0 \le SSI(x,y) \le 1$ as a consequence of (6).
Moreover, SSI(x,y)=1 when x=y. It is because when x=y, $$\sum_{i \in I(x,y)} w_i \frac{|x_i - y_i|}{|x_i| + |y_i|} = \sum_{i \in I(x,y)} w_i \frac{0}{|x_i| + |y_i|} = 0 \quad (7)$$

Therefore, $$SSI(x, y) = 1 - \frac{1}{\sum_{i=1}^{n} w_i I_i^x + \sum_{i=1}^{n} w_i I_i^y} \sum_{i \in I(x,y)} w_i \frac{|x_i - y_i|}{|x_i| + |y_i|} \quad (8)$$

$$= 1 - \frac{1}{\sum_{i=1}^{n} w_i I_i^x + \sum_{i=1}^{n} w_i I_i^y} * 0$$

$$= 1 - 0$$

$$= 1$$

On the contrary, SSI(x,y)=0 when either $I_i^x=0$ or $I_i^y=0$ but not both or equivalently $I_i^x + I_i^y = 1$. It is because $$\frac{|x_i - y_i|}{|x_i| + |y_i|} = \frac{|x_i|}{|x_i|} = 1 \text{ if } I_i^x = 1 \text{ and } I_i^y = 0 \quad (9)$$

and $$\frac{|x_i - y_i|}{|x_i| + |y_i|} = \frac{|-y_i|}{|y_i|} = 1 \text{ if } I_i^x = 0 \text{ and } I_i^y = 1 \quad (10)$$

Therefore, $$SSI(x, y) = 1 - \frac{1}{\sum_{i=1}^{n} w_i I_i^x + \sum_{i=1}^{n} w_i I_i^y} \sum_{i \in I(x,y)} w_i \frac{|x_i - y_i|}{|x_i| + |y_i|} \quad (11)$$

$$= 1 - \frac{1}{\sum_{i=1}^{n} w_i I_i^x + \sum_{i=1}^{n} w_i I_i^y} \sum_{i \in I(x,y)} w_i$$

$$= 1 - \frac{1}{\sum_{i=1}^{n} w_i (I_i^x + I_i^y)} \sum_{i \in I(x,y)} w_i$$

$$= 1 - \frac{1}{\sum_{i \in I(x,y)} w_i} \sum_{i \in I(x,y)} w_i$$

$$= 1 - 1$$

$$= 0$$

This section illustrates the use of the proposed signature similarity index calculated for two example signature vectors. Let x, and y denote two customer activity signature vectors derived from an activity network. For example, let x represent the signature vector derived from the activity sequence "NRR-NRR-SAL/PP" and let y represent the signature vector derived from the activity sequence "NRR-SAL/PP".

The intelligent labeling system 134 uses the activity sequences used to derive the signature vectors to find matching sequences in the Behavior Variable Tables 4-8, and keeps track of the dimensions of the signature vector in which the $i^{th}$ behavior variable has a non-zero value. For the activity sequence "NRR-NRR-SAL/PP", the signature vector x is:

x=(0,0,0,0,0,1,1,0,0,0,0,0,0,0,0,0,1,2,2,2,2,0,0,1,0,0,0,0, 0,0,0,0,0,1,0,0) For the activity sequence "NRR-SAL/PP", the signature vector y is:

y=(0,0,0,0,0,1,0,0,0,0,0,0,0,0,0,0,2,1,1,1,1,0,0,1,0,0,0,0, 0,0,0,0,0,0,1,0) The intelligent labeling system 134 may maintain an indicator I that denotes the set of dimensions for the pair of signature vectors (x,y) in which the $i^{th}$ behavior variable has a non-zero value. That is, I(x,y)={6, 7, 17, 18, 19, 20, 21, 24, 34, 35}. Moreover, $I_i^x=1$, where i=6, 7, 17, 18, 19, 20, 21, 24, 34. Otherwise, $I_i^x=0$.
and
$I_i^y=1$, where i=6, 17, 18, 19, 20, 21, 24, 35. Otherwise, $I_i^y=0$.

Let $w_i$ denote the weight for individual signature variable i, where i=1, 2 . . . 36, and $w_i \in \Re^+$. For simplicity, we assume $w_i=1$ for i=1, 2, . . . , 36.

Thus, $\Sigma_{i \in I(x,y)} w_i I_i^x = 9$, and $\Sigma_{i \in I(x,y)} w_i I_i^y = 8$.

In this case, the intelligent labeling system 134 calculates $$SSI(X, Y) = 1 - \frac{1}{9+8} * \left( \frac{0}{2} + \frac{1}{1} + \frac{1}{3} + \frac{1}{3} + \frac{1}{3} + \frac{1}{3} + \frac{1}{3} + \frac{0}{2} + \frac{1}{1} + \frac{1}{1} \right) = 0.7255.$$

Moreover, if the $7^{th}$ signature variable is weighted as twice important as other variables, that is, $W_7=2$ and the rest is kept the same. Then $\Sigma_{i \in I(x,y)} w_i I_i^x$ becomes 10 and therefore SSI changes to $$0.6852 \left( = 1 - \frac{1}{10+8} * \left( \frac{0}{2} + 2*\left(\frac{1}{1}\right) + \frac{1}{3} + \frac{1}{3} + \frac{1}{3} + \frac{1}{3} + \frac{1}{3} + \frac{0}{2} + \frac{1}{1} + \frac{1}{1} \right) \right).$$

This is because signatures X and Y are more dissimilar to each other in terms of twice weighted $7^{th}$ variable.

As can be seen, signature similarity index (SSI) may change if a behavior variable is given more or less weight. Therefore, one may use SSI to separate apart signatures of distinct structure and behavior through tuning the variable weights. For example, a statistical procedure such as experimental design may help identify the underlying SSI distribution and aid weight selection. Depending on the context, a rule of thumb is to moderately (1x-2x) overweight a limited few (i.e., key) behavior variables that can effectively separate fraudulent behavior from others.

Referring to FIG. 3, given the pairwise signature similarity indexes calculated for the activity sequences extracted from the activity network, the next step is for the intelligent labeling system 134 to identify clusters of signature vectors, which represent dominant patterns (block 316). The signature vectors within a cluster or group are similar to each other whereas the signature vectors from different groups are dissimilar. A group of signature vectors within a cluster having significant volume within the cluster is identified as a common pattern. And the largest group of signature vectors or common pattern in the cluster is identified as the dominant pattern. According to one embodiment, the intelligent labeling system 134 assumes that the dominant pattern manifests the most common behavior from the activities extracted from an activity network. Note that there may exist multiple dominant patterns in a sophisticated activity network as human behavior is known to be volatile and multifaceted.

There are many techniques to extract common patterns from an activity network, including identifying homogeneous groups such as cluster analysis, maximal clique, connected undirected graph, and so on. According to one embodiment, the intelligent labeling system 134 utilizes a hybrid approach to detect a dominant pattern and common patterns from a pairwise signature vector similarity matrix.

Figure 5:
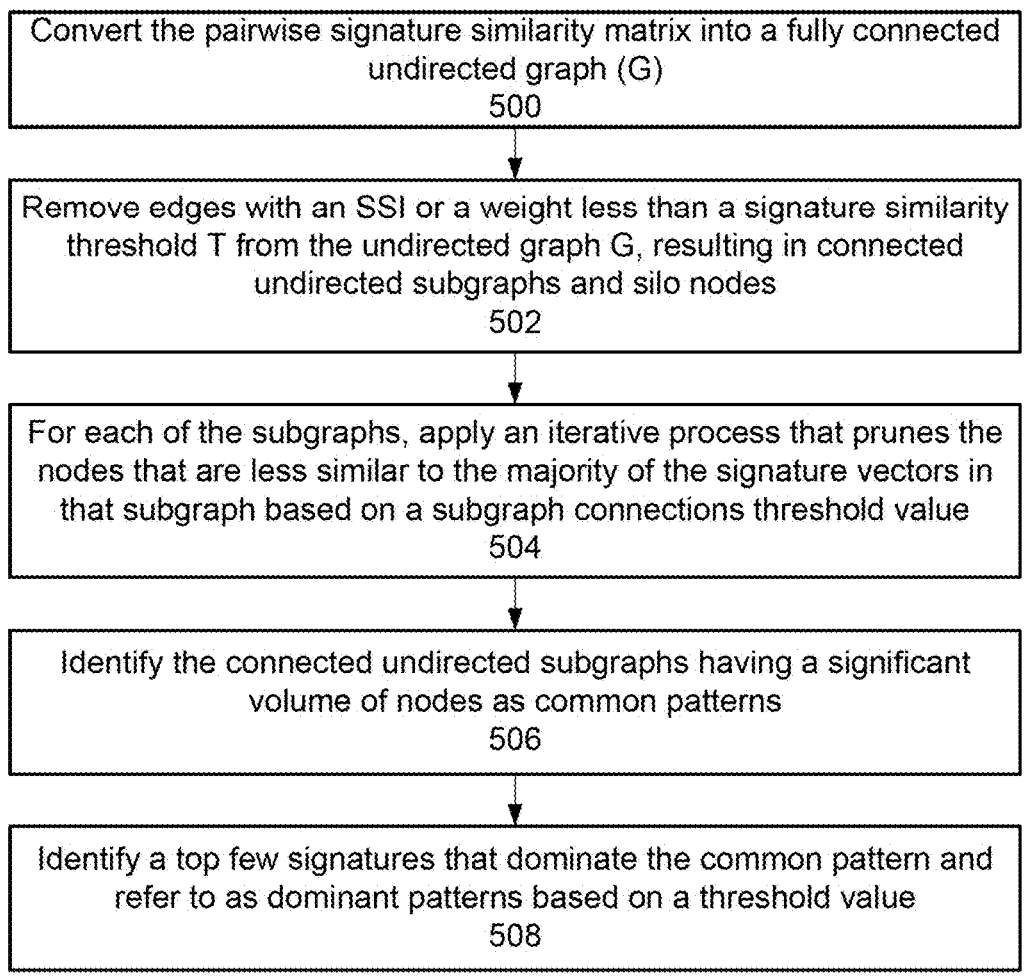
FIG. 5 is a flow diagram illustrating a process for detecting dominant/common patterns from a pairwise signature vector similarity matrix.

FIG. 5 is a flow diagram illustrating a process for detecting a dominant pattern and common patterns from a pairwise signature vector similarity matrix index. In one embodiment, the dominant/common patterns are represented as strongly connected undirected subgraphs and the pairwise signature vector similarity matrix index (SSI) are represented by a fully connected undirected graph. The process shown in FIG. 5 is performed by the intelligent labeling system 134 in one embodiment.

The process may begin by converting the pairwise signature similarity matrix into a fully connected undirected graph (G) (block 500).

Figure 6:
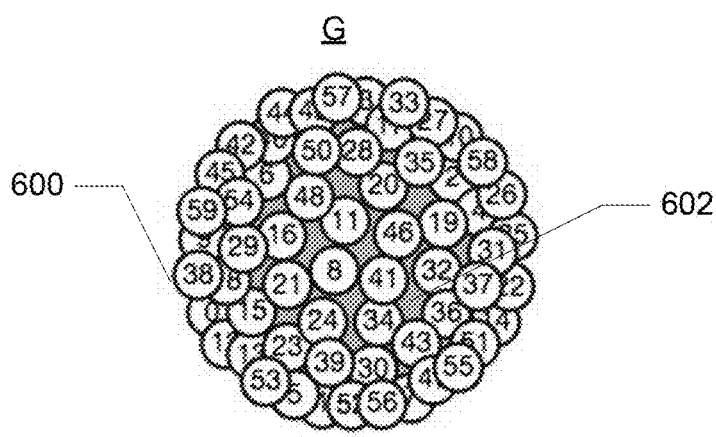
FIG. 6 is a diagram illustrating an example fully connected undirected graph (G).

FIG. 6 is a diagram illustrating an example fully connected undirected graph (G). The nodes (or vertexes) 600 of graph G are signature vectors. Edges 602 (hidden in this Figure) between the nodes have a connection weight, which represents the signature similar index (SSI) between the two connected nodes (signature vectors).

Referring again to FIG. 5, edges with an SSI or weight less than a signature similarity threshold T are removed from the undirected graph G (i.e., to remove weak SSI or weights). For example, all edges with weight less than signature similarity threshold T ∈ (0,1) are removed, resulting in numerous connected undirected subgraphs (common patterns) and silo nodes (i.e., nodes not connected to any other node) (block 502).

For each of the undirected subgraphs, an iterative process is applied that prunes the nodes that are less similar to the majority of the signature vectors in that subgraph based on a subgraph connections threshold value S (block 504). In one embodiment, the iterative process is configured to:
  a) Arrange the nodes in the subgraph in ascending order of number of connections (edges) to other nodes in the same subgroup. If there is a tie, break it arbitrarily. Put the ordered nodes in a list.
  b) Start with the node on top of the list, that is, the node with the least number of connections to other nodes in that subgraph.
  c) If the node's number of connections divided by the number of all other nodes (i.e., total number of nodes minus one) in that subgraph is greater than or equal to the subgraph connections threshold value (e.g., S∈[0, 1]), then stop. Note that, the higher S is, the stronger and more coherent a subgraph (common pattern) is.
  d) Otherwise, remove the node and all its connections to other nodes from the subgraph.

e) Go to Step a) until the stopping criteria (c) is met or all nodes in the list have been processed.

The connected undirected subgraphs having a significant volume of nodes are identified as common patterns (block 506). A number that represents a significant volume of nodes in a connected undirected subgraph is dependent upon the application and is configurable.

Note that a common pattern may comprise several signature vectors. Therefore, at least one (e.g., a few) top signature vector that dominates the common patterns is identified and referred to as a dominant pattern based on a threshold value (block 508). In one embodiment, the process to identify dominant patterns is configured to:

a) For each of the common patterns, sort its signature vectors in descending order of number of connections (edges) to other signature vectors (nodes) in the common pattern. If there is a tie, break it arbitrarily. Put the sorted signatures in a list.

b) Label the signature vector on top of the list as a dominant pattern.

c) Delete all other connected signature vectors that have the same sequence of activities and/or signature vector with the top signature from the list.

d) Delete the top signature vector from the list.

e) If the number of remaining signatures in the list is fewer than a threshold X percent of the total number of signatures in the common pattern, then stop.

f) Otherwise, go to Step a).

Referring again to FIG. 3, a classification scheme is used to evaluate and label at least the identified dominant patterns and (as good behavior or fraudulent behavior (block 318). In one embodiment, the classification scheme may also label some or all of the common patterns as well. In one embodiment, the classification scheme may involve human judgment, operational insights, or an analytical technique such as scoring or decision trees to label the identified dominant/common patterns as good behavior or fraudulent behavior.

In one embodiment, a mathematical equation can be employed to generate the fraudulent score for every identified dominant and/or common pattern based on a strength of obfuscation level, efficiency, and abnormality in terms of store policy and customer behavior. In one embodiment, the equation transforms the following information collected from a dominant and/or common pattern into a score that ranges between 0 and 1, for example, as other ranges can also be used. The higher the score a dominant and/or common pattern is given, the higher the likelihood of fraud. In one embodiment, a threshold value is chosen to classify and label the dominant and/or common patterns as good behavior (non-fraudulent) and fraudulent behavior. Alternative labels may include "non-fraudulent" and "fraudulent", or "non-fraud" and "fraud", or "good" and "bad", and the like.

In one embodiment, the following characteristics and behavior data may become inputs to the mathematical equation that renders a fraudulent score/label:

Number of store visits

Number of different customer identities (e.g., driver's license)

Number of different type of visits (referring to Table 1)

Number of different stores visited

Frequency of abnormal steps which specifically were constructed/planned to exploit the loopholes existing in merchant processes and policies Frequency of abnormal steps which take advantage of location proximity of stores in a region to reduce the exposure to and suspicion by store associates Frequency of uncommon practice to pay higher fees to convert restricted funds to unrestricted funds Frequency of repeated activity sequences in short time period within a network which forms clear fraud pattern Frequency of activity sequences in which fraudsters attempt to hide themselves by taking extra steps to cash out shoplifted items, e.g., a non-receipt return, followed by a sale followed by an exchange, followed by a receipt return More . . .

Once the patterns have been scored and classified, business feedback 322 (e.g., from fraud return desks in the stores) is used to confirm if a fraud labeled return attempt is actually fraudulent to confirm the fraud label and to expand the fraud definition (block 320).

To scale the process for a retailer that has millions of returns daily and probable hundreds of millions of sequences of activities, the process may begin by identifying common or regular patterns from large activity networks. A large activity network may include thousands of store visits or come from a 75% percentile pool in terms of network size (i.e., number of store visits). Next, the dominant members out of the common or regular patterns may be identified and the fraudulent score computed as described in Block 316. With aid from human judgment, operational insights, and an appropriate score cutoff value or threshold, the newly discovered dominant patterns can be labeled as fraud or non-fraud. This set of labeled dominant patterns can be treated as normal patterns as they are derived from large networks with statistical significance.

For the remaining small to medium-sized activity networks, a random sample (i.e., 10%) of activity networks can be collected and run through the process of identifying the corresponding dominant patterns. Furthermore, as an additional benefit, one may compare the similarity between the dominant patterns from the small to medium-sized networks and the normal patterns to determine if the former is an anomaly. As to the remaining regular patterns, they will be labeled (fraud or non-fraud) appropriately according to the fraudulent score.

Finally, the intelligent labeling system 134 submits the confirmed fraud labels to a central repository, such as the fraud labels 108 of FIG. 1 for use by the real-time predictive intelligent platform 101. It should be noted that the analytics component 132 shown in FIG. 1 is not a real-time process, but instead performs the intelligent labeling 134 and supervised training 136 off-line.

Referring again to FIG. 1, the supervised training component 136 aids the PI platform 101 in predicting fraudulent behavior. The models derived from the supervised training may be used by the PI platform 101 to advise store return desk personal whether to deny, warn, or accept attempted store returns in real-time. Further, the system results in a lowered rate of false positive determinations of return fraud, thereby minimizing impact on customers.

Figure 7:
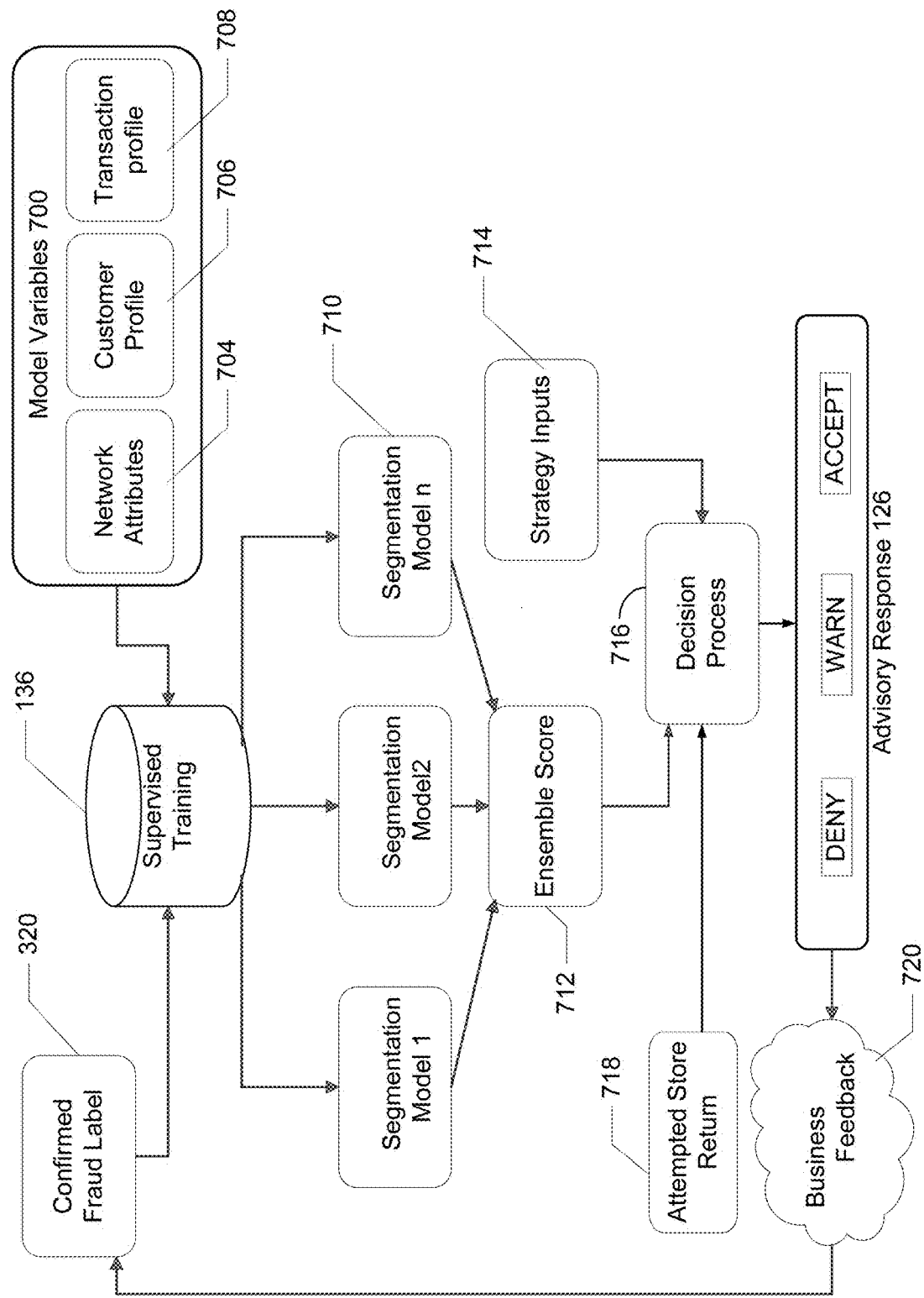
FIG. 7 is a diagram illustrating the use of the supervised training by the predictive intelligent platform.

FIG. 7 is a diagram illustrating the use of the supervised training by the predictive intelligent platform. Both the confirmed fraud labels 320 and model variables 700 are input to the supervised training 136. Based on confirmed fraud labels 320, the supervised model training 136 generates one or more segmentation models 710, which may include one or more predictive models, to create models for different geographical regions or for slices of the network 112. The function of the predictive models is to render a score as an assessment of the likelihood that a pending store return is fraudulent. Technically, the supervised learning process employs a linear or non-linear machine learning algorithm for model training and consumes a variety of information (700) derived from activity networks such as network attributes (704), customer profile (706), and transaction profiles (708), and possibly other sources. Moreover, the predictive models may be segmented in a business or data-driven approach to capture regional signals (710).

The scores generated by the predictive models based on the confirmed fraud labels are combined to render an ensemble score 712. In one embodiment, generation of the ensemble score 712 may be accomplished using different combinations of the segmentation models 710 and/or applying different weights to the segmentation models 710. For example, for one particular region, a maximum score of two or more particular segmentation models 710 may be used. Once the segmentation models 710 are created, they can be deployed for real-time return transactions.

An attempted store return 718 is input into a decision process 716 performed by the decision engine 110. The decision process 716 may combine the ensemble score 712 with other strategy inputs 714 (e.g., guidelines, policies and best practices) to generate a final advisory response 126 for the attempted store return 718. The decision process 716 generates and sends a recommendation in the form of an advisory response 126 to the originating store return desk to deny, warn or accept the store return 718. Recurring business feedback 720 from the store return desk is used to confirm the fraud label in the case of a denial.

Case Study

The Assignee of the present application disclosure illustrates the intelligent fraud activity labeling process with real data. A sample of five activity networks were randomly selected from a retail store returns database between over a period of 7 days. The length or number of activities in each network ranged from 35 to 500+. Values for the signature similarity threshold T (block 502), the connections threshold S (block 504), and the threshold X (block 508) where set at 0.7, 0.5, and 0.3, respectively.

Based on the degree of diversity of customer activities (see Table 1 and Table 2), three networks with highly diversified customer activities are combined into one group (GRP1). And the remaining two networks form another group (GRP2). In practice, there is no restriction in the matter to organize activity networks. The proposed labeling process can apply to a single activity network or any combined networks.

Next, sequences of activities are extracted from groups GRP1 and GRP2, respectively. The process focused on the activity sequences initiated by a non-receipted return activity (NRR) exclusively. This is because based on historical data, a non-receipted return has a much higher fraud rate than other types of returns. In the end, there were sixty activity sequences selected from group GRP1 and thirty-five activity sequences selected from group GRP2.

Following the methodology described in block 236 of FIG. 2, each of the ninety-five (60+35) sequences of activities is represented by a signature vector comprising thirty-six variables (see Table 4 to Table 8).

Figure 8A:
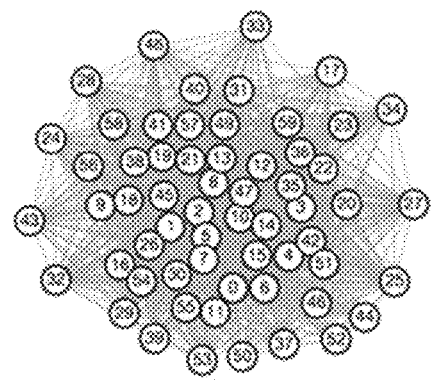
FIG. 8A is a diagram illustrating common patterns in Group G1 with signature similarity threshold T=0.3.
Figure 8B:
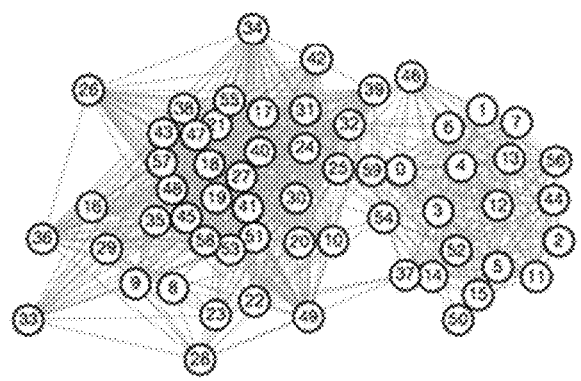
FIG. 8B is a diagram illustrating common patterns in Group G1 with signature similarity threshold T=0.5.
Figure 8C:
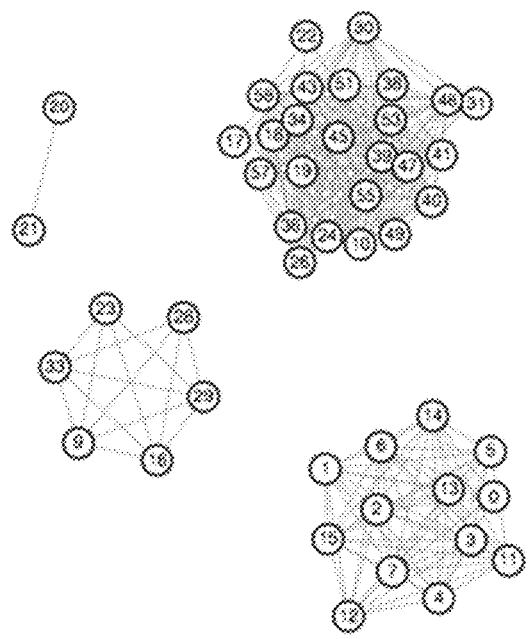
FIG. 8C is a diagram illustrating common patterns in Group G1 with signature similarity threshold T=0.7.

FIG. 8A is a diagram illustrating common patterns in Group G1 with signature similarity threshold T=0.3. FIG. 8B is a diagram illustrating common patterns in Group G1 with signature similarity threshold T=0.5. FIG. 8C is a diagram illustrating common patterns in Group G1 with signature similarity threshold T=0.7.

As can be seen in FIGS. 8A and 8B, signature similarity threshold value T plays an important role in forming the common patterns. Three different levels of similarity were experimented with, Low (T=0.3), Medium (T=0.5), and High (T=0.7). The best separation effect occurred when T equals 0.7. A low similarity threshold value tends to end up with a fully connected yet clogged subgraph-see FIG. 8A. On the contrary, a very high similarity threshold value is likely to generate several thin subgraphs. Therefore, there is always a trade-off while designing the value for the similarity threshold T.

Given T=0.7, several subgraphs emerge from group GRP1. Specifically, at least four common patterns and further dominant patterns are found in group GRP1:
 a) The subgraph represented by dominant signatures #10 (repeated NRR-SAL) and #39 (RR-SAL-NRR-SAL),
 b) The subgraph represented by dominant signatures #1 (NRR-SAL/PP-SAL) and #15 (NRR-NRR/CASH-SAL/PP)
 c) The subgraph represented by dominant signatures #9 (NRR-SAL-NRR) and #23 (NRR-SAL-RR/CASH)
 d) The subgraph represented by dominant signature #21 (RR-SAL-RR-NRR-SAL).

A qualitative analysis that involves human judgment, domain knowledge, and operational insights suggests the dominant patterns in (a), (b), and (c) are fraudulent and have distinct behavior. Specially, the dominant patterns in (a) represent the group with frequent and intensive return activities in a short period of time and of high mobility and profitability. For example, a typical sequence of activities in this category is as follows: RR-SAL-NRR-SAL.

On the other hand, the dominant patterns in (b) show a totally different type of fund exit behavior. In contrast to the dominant patterns in (a), the dominant patterns in (b) incur a prepaid card purchase shortly after a non-receipted return. For example, a typical sequence of activities in this regard looks like this: NRR-SAL/PP-SAL.

Moreover, the dominant patterns in (c) have a relatively short sequence of activities as opposed to others but involves high mobility and intensity of returns within one or two days. The fund normally exits the retailer system through a receipted cash refund. This manifests the typical hit-and-run type of fraudulent returns. For example, a typical sequence of activities in this regard is NRR-SAL-RR/CASH.

In summary, the common traits of fraudulent patterns include frequent and intensive returns, high mobility and profitability, and funds leaving the retailer system eventually.

Figure 9A:
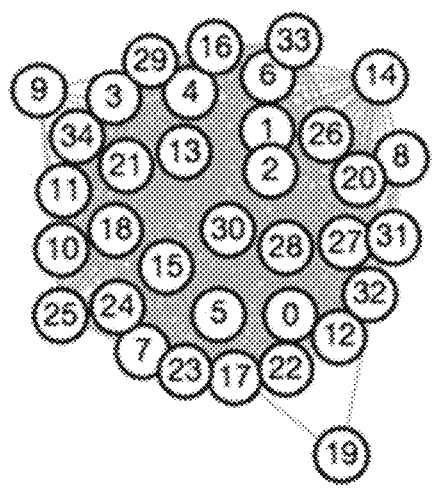
FIG. 9A is a diagram illustrating common patterns in Group G2 with signature similarity threshold T=0.3.
Figure 9B:
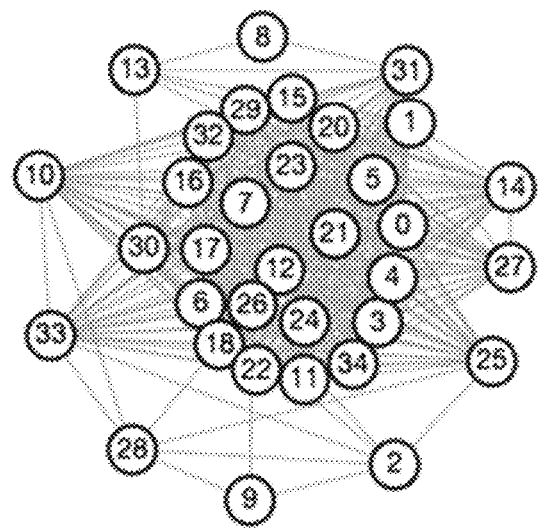
FIG. 9B is a diagram illustrating common patterns in Group G2 with signature similarity threshold T=0.5.
Figure 9C:
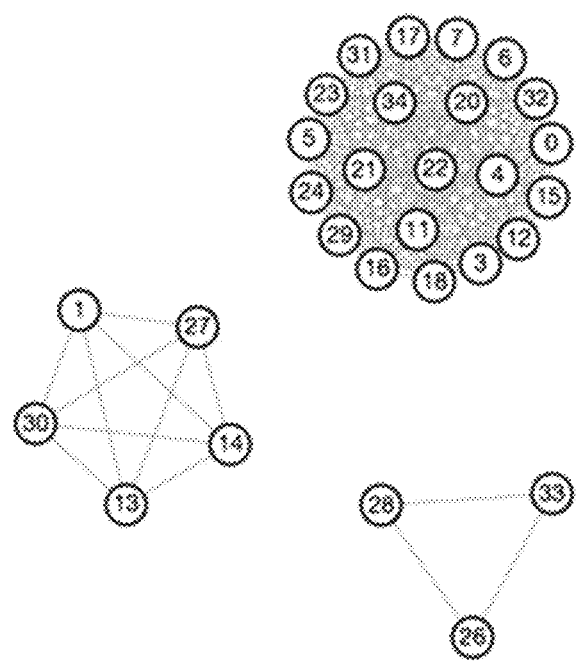
FIG. 9C is a diagram illustrating common patterns in Group G2 with signature similarity threshold T=0.7.

FIG. 9A is a diagram illustrating common patterns in Group G2 with signature similarity threshold T=0.3. FIG. 9B is a diagram illustrating common patterns in Group G2 with signature similarity threshold T=0.5. FIG. 9C is a diagram illustrating common patterns in Group G2 with signature similarity threshold T=0.7. Likewise, three patterns were found in group GRP2.
 a) The subgraph represented by dominant signature #22 (NRR-SAL)
 b) The subgraph represented by dominant signature #13 (a NRR followed by repeated purchases e.g., NRR-SAL-SAL).
 c) The subgraph represented by dominant signature #26 (NRR-SAL-RR).

The dominant patterns in (a) are a non-receipted return followed by a store purchase (NRR-SAL). Both the return and purchase are connected through a common tender (i.e., SVC) and made in the same store. In most of the cases, the following purchase costs more than the previous return refund and thus ends up with a negative profitability for the customer. This is determined normal and non-fraudulent behavior.

Besides, the dominant patterns in (b) indicate a longer sequence of activities such as NRR-SAL-SAL. Nevertheless, the patterns show no evidence of activity to exit funds quickly after a return. Activity is typically seen in a week or two from return and not in the next day or two. This is determined normal and non-fraudulent behavior as well.

In summary, there are clear and clean patterns found in group GRP2 and they are all normal and non-fraudulent behavior.

A method and system for intelligent fraud activity labeling system utilizing self-evolving customer identity and relationship network for detection and prevention of fraudulent store returns has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD/BD and is to be executed by one or more processors. Accordingly, many modifications may be made by one of ordinary skill in the art without departing from the spirit and scope of the appended claims.

We claim:

1. A computer-implemented method for identifying and labeling fraudulent store return activities, comprising:
   receiving, by a server, retailer events from an online transaction system of a retailer, the retailer events comprising records of transactions between customers and the retailer, including sale, exchange, and return activities across multiple stores;
   processing the retailer events to build a network that associates stores, transactions, payment instruments, and customer identification over related activity sequences of transactions; and
   generating return fraud labels for the retailer events representing returns based on fraud characteristics of the related activity sequences by:
      representing behavior variables associated with activity sequences by respective signature vectors, wherein each respective signature vector represents a plurality of the behavior variables, and wherein each of the plurality of behavior variables for each respective signature vector represents a differing activity sequence of the activity sequences;
      calculating a pairwise similarity value between each pair of the signature vectors;
      identifying clusters of the signature vectors having common behavior patterns based on the calculated pairwise similarity values;
      identifying the fraud characteristics based on the clusters of the signature vectors;
      labeling the identified clusters of signature vectors as non-fraudulent behavior or fraudulent behavior based on the fraud characteristics; and
      storing the labelled clusters of signature vectors in a data repository; and
   training at least one machine learning model based on the stored labelled clusters of signature vectors.

2. The method of claim 1, wherein processing the retailer events further comprises: representing one or more of the activity sequences by a respective activity network graph in a customer ID and relationship network.

3. The method of claim 2, wherein representing behavior variables associated with the activity sequences by respective signature vectors further comprises: extracting one or more categories of behavior variables from the activity sequences including: sequence behavior variables used to measure number of occurrences of customer sequential activities, mobility behavior variables used to measure customer mobility within a sequence of activities, temporal behavior variables used to measure recency and intensity of customer activities, fund exit behavior variables used to count occurrences of fund exit activities, and profitability behavior variables used to measure the net refund from a sequence of activities.

4. The method of claim 1, wherein representing behavior variables associated with activity sequences by respective signature vectors further comprises: combining n behavior variables from one or more the categories to create the respective signature vectors.

5. The method of claim 1, wherein calculating pairwise similarity between the signature vectors further comprises: calculating a signature similarity index between two of the signature vectors.

6. The method of claim 5, further comprising: calculating a similarity metric to discretized the signature vectors with tunable weighted behavior variables.

7. The method of claim 5, further comprising: calculating a signature similarity metric (SSI) between signature vectors x and y as:

$$SSI(x, y) = 1 - \frac{1}{\sum_{i=1}^{n} w_i I_i^x + \sum_{i=1}^{n} w_i I_i^y} \sum_{i \in I(x,y)} w_i \frac{|x_i - y_i|}{|x_i| + |y_i|}$$

where $w_i$ denotes the weight for an individual behavior variable i, where i=1, 2, ..., n, and I(x·y) denotes a set of dimensions where a value in either of the signature vectors x and y is non-zero.

8. The method of claim 1, wherein identifying clusters of the signature vectors having common behavior patterns based on a calculated pairwise similarity matrix index (SSI) further comprises:
   for at least a portion of the clusters, identifying a group of the signature vectors having a significant volume within the cluster as a common pattern, and identifying a largest group of the signature vectors in the cluster as a dominant pattern.

9. The method of claim 8, further comprising:
   converting the pairwise signature similarity matrix into a fully connected undirected graph (G) having nodes representing signature vectors, and edges connecting two nodes having a connection weight representing the signature similarity index (SSI);
   removing the edges having connection weight is less than a signature similarity threshold, resulting in a plurality of connected undirected subgraphs representing common patterns and silo nodes;
   for one or more of the undirected subgraphs, prune the nodes that are less similar to the majority of the signature vectors in the corresponding undirected subgraph based on a connections threshold value;
   identifying the connected undirected subgraphs having a significant volume of nodes as the common patterns; and
   identifying at least one top signature vector as the dominant pattern based on a threshold value.

10. The method of claim 1, wherein processing the retailer events further comprises: characterizing at least a portion of the retailer events using different types of retailer events and different types of channels used to exit funds.

11. The method of claim 10, further comprising: associating the retailer events with one or more of an event ID, a timestamp, a store number, a receipt number in case of a purchase, a transaction amount, a funding or receiving tender number, and a customer ID in case of a non-receipted return.

12. The method of claim 1, further comprising:
receiving return data characterizing a store return; and
applying the trained at least one machine learning model to the return data to determine if the store return is fraudulent.

13. A computer readable media comprising executable instructions, wherein the instructions, in response to execution by a processor, cause the processor to:
receive, by a server, retailer events from an online transaction system of a retailer, the retailer events comprising records of transactions between customers and the retailer, including sale, exchange, and return activities across multiple stores;
process the retailer events to build a network that associates stores, transactions, payment instruments, and customer identification over related activity sequences of transactions; and
generate return fraud labels for the retailer events representing returns based on fraud characteristics of the related activity sequences by:
representing behavior variables associated with activity sequences by respective signature vectors, wherein each respective signature vector represents a plurality of the behavior variables, and wherein each of the plurality of behavior variables for each respective signature vector represents a differing activity sequence of the activity sequences;
calculating a pairwise similarity value between each pair of the signature vectors;
identifying clusters of the signature vectors having common behavior patterns based on the calculated pairwise similarity values;
identifying the fraud characteristics based on the clusters of the signature vectors;
labelling the identified clusters of signature vectors as non-fraudulent behavior or fraudulent behavior based on the fraud characteristics; and
storing the labelled clusters of signature vectors in a data repository; and
train at least one machine learning model based on the stored labelled clusters of signature vectors.

14. The computer readable media of claim 13, wherein the instructions to process the retailer events further include instructions that cause the processor to: represent one or more of the activity sequences by a respective activity network graph in the customer ID and relationship network.

15. The computer readable media of claim 13, wherein the instructions to represent behavior variables associated with the activity sequences by respective signature vectors further includes instructions that cause the processor to: combine n behavior variables from the one or more the categories to create the signature vector.

16. The computer readable media of claim 15, wherein the instructions to represent behavior variables associated with the activity sequences by respective signature vectors further includes instructions the cause of the processor to: extract one or more categories of behavior variables from the activity sequences including: sequence behavior variables used to measure number of occurrences of customer sequential activities, mobility behavior variables used to measure customer mobility within a sequence of activities, temporal behavior variables used to measure recency and intensity of customer activities, fund exit behavior variables used to count occurrences of fund exit activities, and profitability behavior variables used to measure the net refund from a sequence of activities.

17. The computer readable media of claim 13, wherein the instructions to calculate pairwise similarity between the signature vectors further includes instructions that cause the processor to: calculate a signature similarity index between two of the signature vectors.

18. The computer readable media of claim 17, wherein the instructions further cause the processor to: calculate a similarity metric to discretized the signature vectors with tunable weighted behavior variables.

19. The computer readable media of claim 17, wherein the instructions further cause the processor to: calculate a signature similarity metric (SSI) between signature vectors x and y as:

$$SSI(x, y) = 1 - \frac{1}{\sum_{i=1}^{n} w_i I_i^x + \sum_{i=1}^{n} w_i I_i^y} \sum_{i \in I(x,y)} w_i \frac{|x_i - y_i|}{|x_i| + |y_i|}$$

where $w_i$ denotes the weight for an individual behavior variable i, where i=1, 2, ..., n, and I(x·y) denotes a set of dimensions where a value in either of the signature vectors x and y is non-zero.

20. The computer readable media of claim 13, wherein the instructions to identify clusters of the signature vectors having common behavior patterns based on a calculated pairwise similarity matrix index (SSI) further includes instructions that the cause the processor to:
for at least a portion of the clusters, identify a group of the signature vectors having a significant volume within the cluster as a common pattern, and identifying a largest group of the signature vectors in the cluster as a dominant pattern.

21. The computer readable media of claim 20, wherein the instructions further cause the processor to:
convert the pairwise signature similarity matrix into a fully connected undirected graph (G) having nodes representing signature vectors, and edges connecting two nodes having a connection weight representing the signature similarity index (SSI);
remove the edges having connection weight is less than a signature similarity threshold, resulting in a plurality of connected undirected subgraphs representing common patterns and silo nodes;
for one or more of the undirected subgraphs, prune the nodes that are less similar to the majority of the signature vectors in the corresponding undirected subgraph based on a connections threshold value;
identify the connected undirected subgraphs having a significant volume of nodes as the common patterns; and
identify at least one top signature vector as the dominant pattern based on a threshold value.

22. The computer readable media of claim 13, wherein processing the retailer events further comprises: characterize at least a portion of the retailer events using different types of retailer events and different types of channels used to exit funds.

23. The computer readable media of claim 22, wherein the instructions further cause the processor to: associate the retailer events with one or more of an event ID, a timestamp, a store number, a receipt number in case of a purchase, a transaction amount, a funding or receiving tender number, and a customer ID in case of a non-receipted return.

24. The computer readable media of claim 13, wherein the instructions further cause the processor to:
receive return data characterizing a store return; and
apply the trained at least one machine learning model to the return data to determine if the store return is fraudulent.

25. A store return fraud detection system, comprising:
one or more memories;
one or more processors coupled to the one or more memories, the one or more processors configured to:
receive retailer events from an online transaction system of a retailer, the retailer events comprising records of transactions between customers and the retailer, including sale, exchange, and return activities across multiple stores;
process the retailer events to build a network that associates stores, transactions, payment instruments, and customer identification over related activity sequences of transactions; and
generate return fraud labels for the retailer events representing returns based on fraud characteristics of the related activity sequences by:
representing behavior variables associated with activity sequences by respective signature vectors, wherein each respective signature vector represents a plurality of the behavior variables, and wherein each of the plurality of behavior variables for each respective signature vector represents a differing activity sequence of the activity sequences;
calculating a pairwise similarity value between each pair of the signature vectors;
identifying clusters of the signature vectors having common behavior patterns based on the calculated pairwise similarity values;
identifying the fraud characteristics based on the clusters of the signature vectors;
labelling the identified clusters of signature vectors as non-fraudulent behavior or fraudulent behavior; and
storing the labelled clusters of signature vectors in the one or more memories; and
train at least one machine learning model based on the stored labelled clusters of signature vectors.

* * * * *